Figure 6:
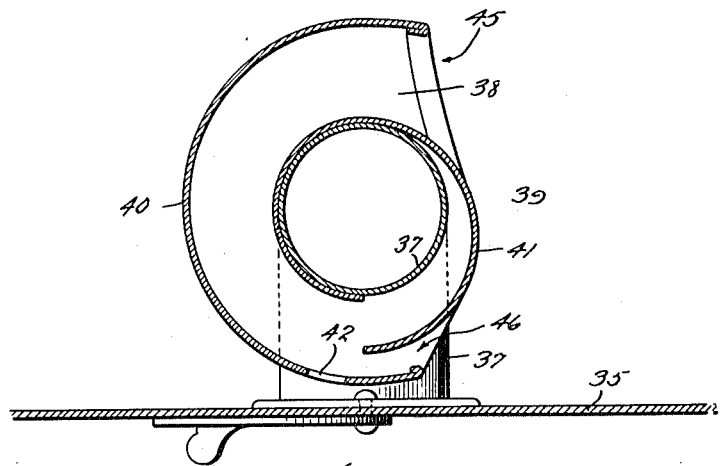

Oct. 4, 1927.
D. K. SWARTWOUT
1,643,966
VENTILATING AND HEATING MEANS FOR CONVEYANCES
Filed Oct. 1, 1921     6 Sheets-Sheet 1
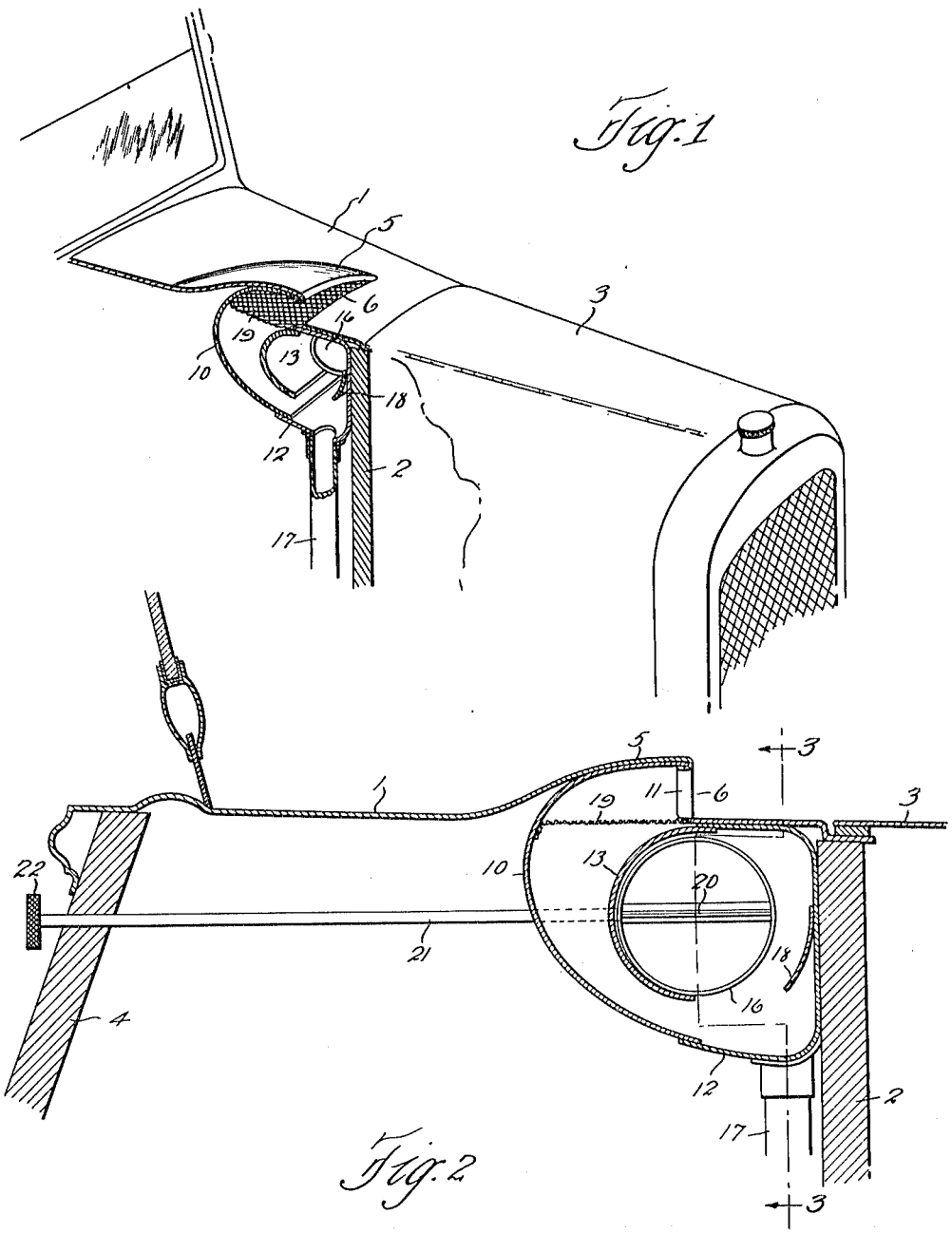

Oct. 4, 1927.
D. K. SWARTWOUT
1,643,966
VENTILATING AND HEATING MEANS FOR CONVEYANCES
Filed Oct. 1, 1921   6 Sheets-Sheet 2
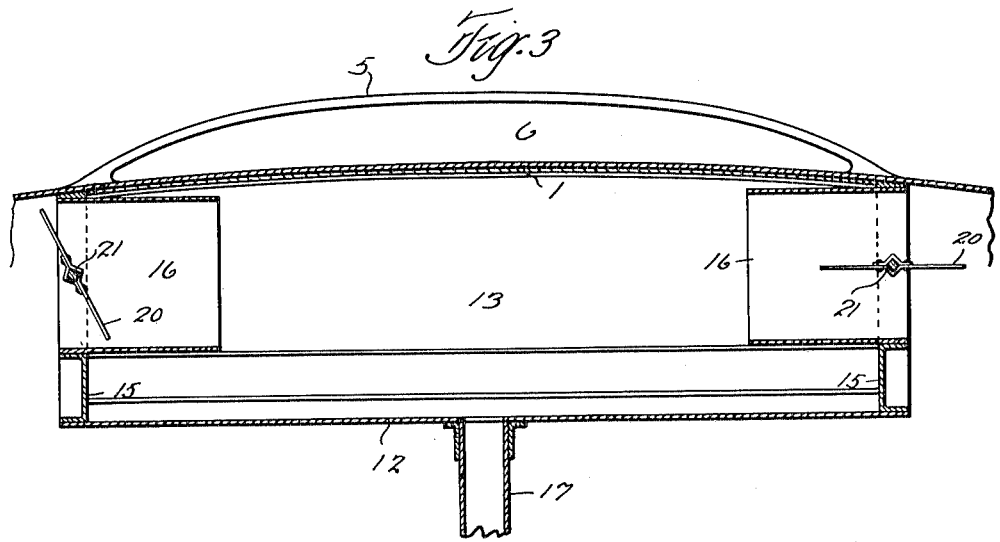
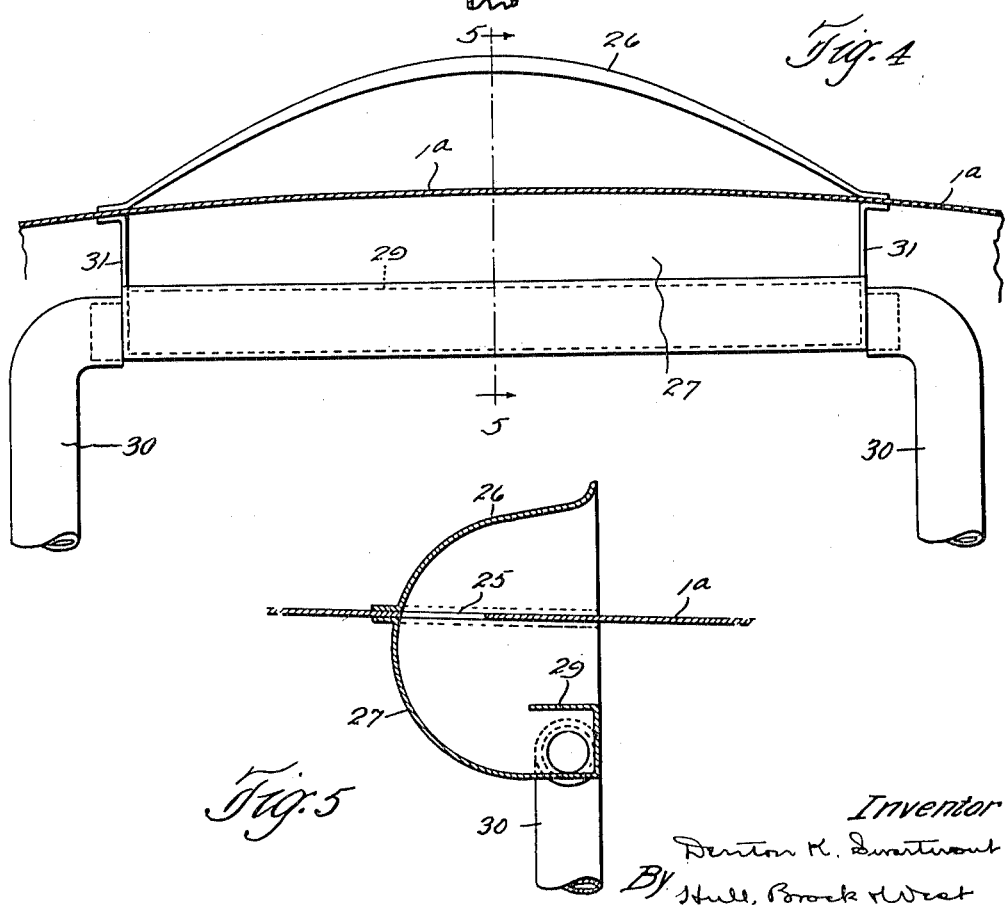
Inventor
Denton K. Swartwout
By Hull, Brock & West
Attys.

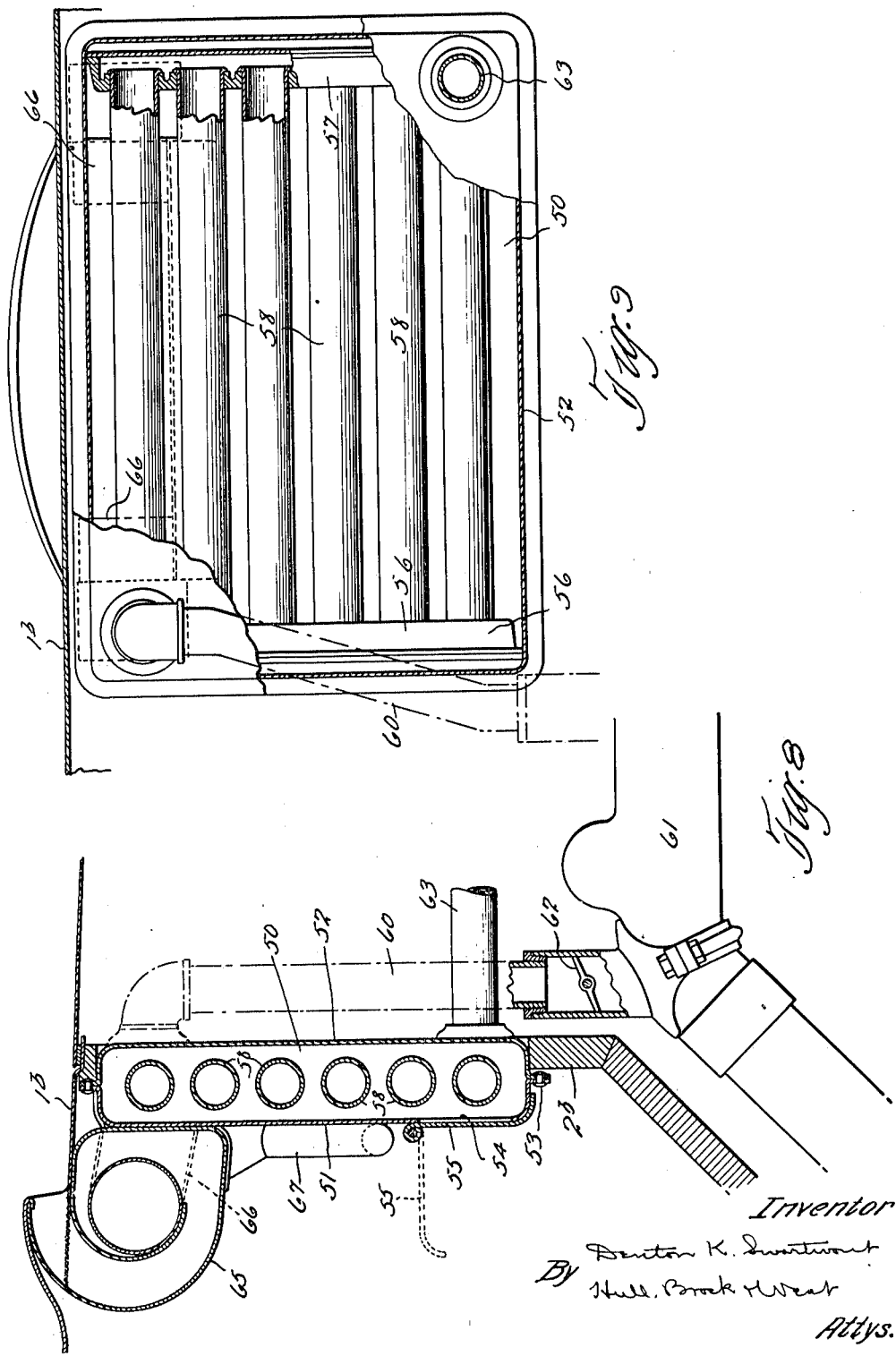

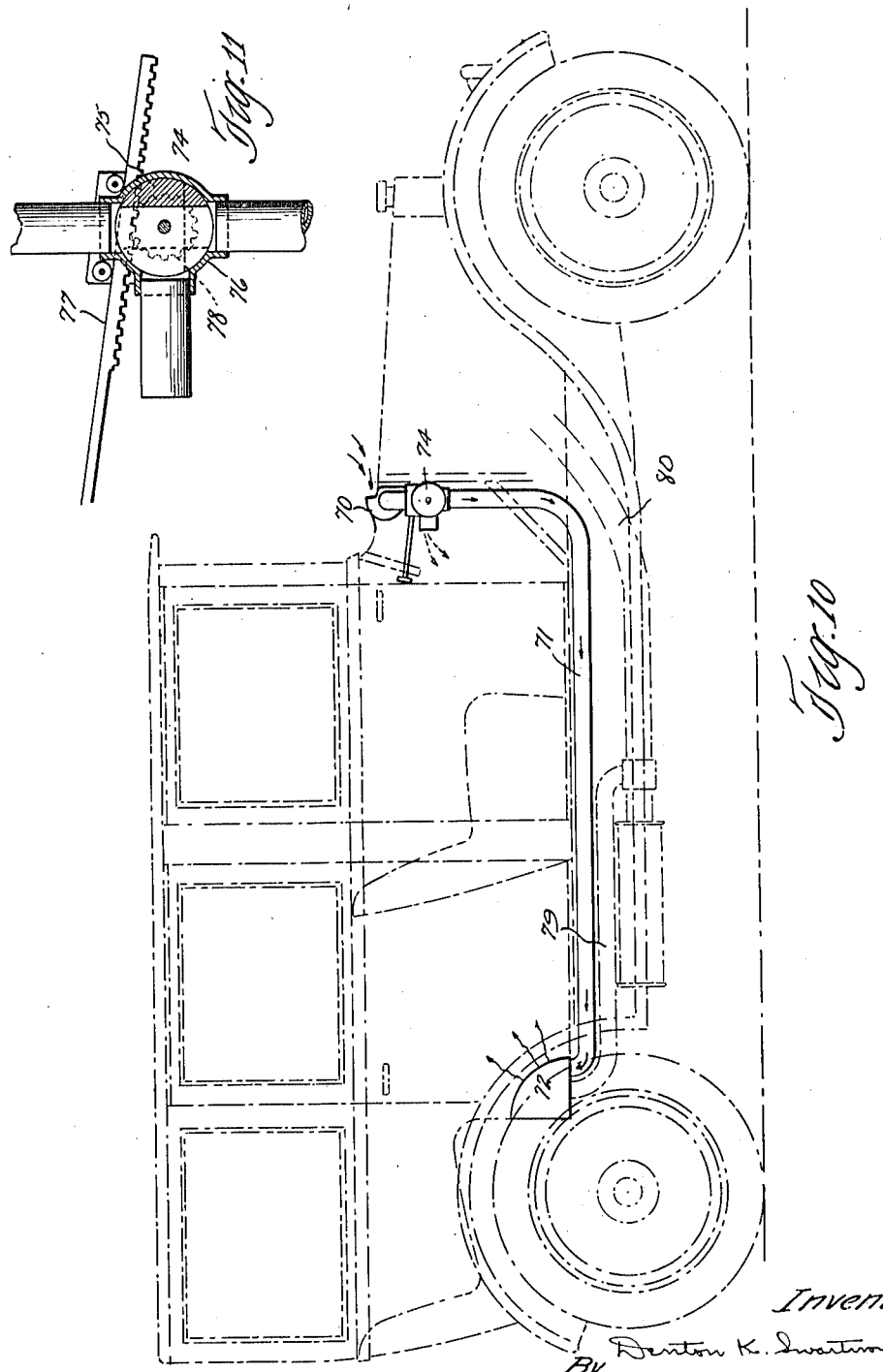

Oct. 4, 1927.

D. K. SWARTWOUT 1,643,966

VENTILATING AND HEATING MEANS FOR CONVEYANCES

Filed Oct. 1, 1921  6 Sheets-Sheet 6

Inventor
Denton K. Swartwout
By Hull, Brock & West
Attys.

Patented Oct. 4, 1927.

1,643,966

UNITED STATES PATENT OFFICE.

DENTON K. SWARTWOUT, OF CLEVELAND, OHIO.

VENTILATING AND HEATING MEANS FOR CONVEYANCES.

Application filed October 1, 1921. Serial No. 504,814.

This invention relates to ventilating means for conveyances and has to do more particularly with apparatus of this character that is peculiarly adapted to the ventilating of automobiles, the invention comprehending within its scope the combining of ventilating and heating means for use on motor vehicles.

The objects of the invention are to provide a highly efficient and very durable ventilator that is immune from disorder, through which a current of air is directed to the interior of the vehicle, the same preferably incorporating means for controlling the volume of air admitted, and which is so designed and constructed as to free the air of rain, moisture, snow, dust or other foreign substances wherewith the air may be ladened, thus delivering to the interior of the conveyance a supply of clean, dry, fresh air.

Other objects are to provide a ventilator of the foregoing nature which is simple of construction, comparatively economical of manufacture, is so designed in its present preferred form, as to harmonize with the lines of an automobile and thus be rendered neat and attractive of appearance; to provide a ventilator of the foregoing character that is compact and therefore capable of being installed within a restricted space as beneath the cowl of the automobile forwardly of the instrument board and to the rear of the dash; and again, and more generally, to provide a ventilator which requires no attention on the part of the driver in that it can be left open at all times, regardless of the weather conditions, in contradistinction to the prevailing forms of ventilators which have to be closed when it rains or snows, my improved ventilator incorporating a drain through which the water extracted from the air is conducted to the exterior of the vehicle.

A still further object of the invention is to combine with a ventilator of the character above described, a heater which may, though not necessarily so, derive its heat from the exhaust of the engine and into heating relation with which, as through the warm air compartment thereof, the air passing through the ventilator may be directed, as by means of a suitable conduit, the conduit when such is used, having incorporated in it, if desired, a damper controlled outlet into the interior of the vehicle so that the entire volume of air passing through the ventilator may be caused to discharge directly into the vehicle, or through the heater into the vehicle, or a part of it may be directed through the heater while the remainder is passed directly into the vehicle.

All of the foregoing objects are attained in one or more of the embodiments illustrated in the drawings accompanying and forming a part hereof, and while I shall proceed to describe these various modifications of the invention in detail, I wish to be understood as not limiting myself to their structural features further than is required by the terms of the claims annexed hereto.

Figure 7:
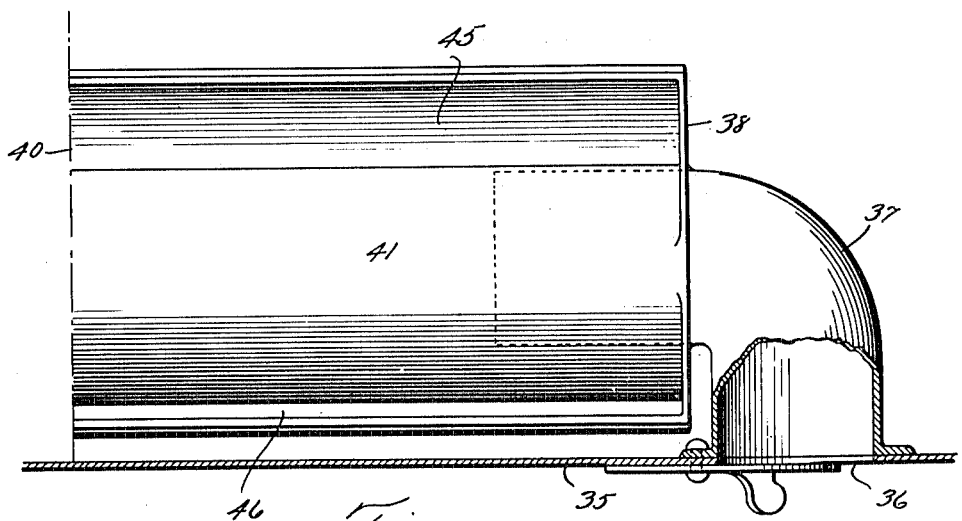
Figure 12:
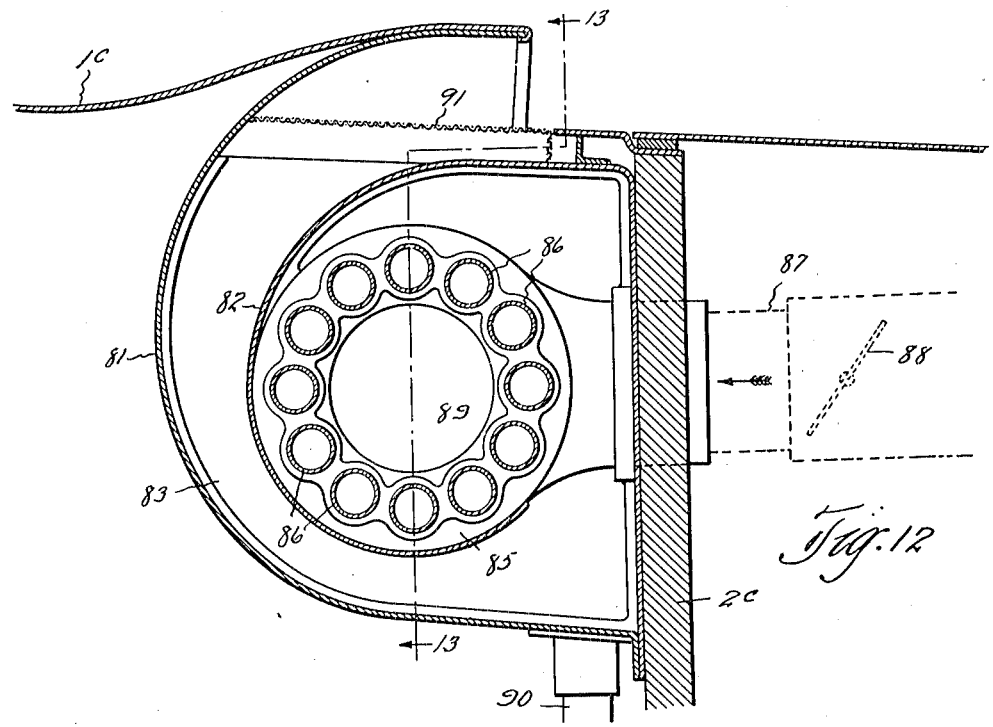
Figure 13:
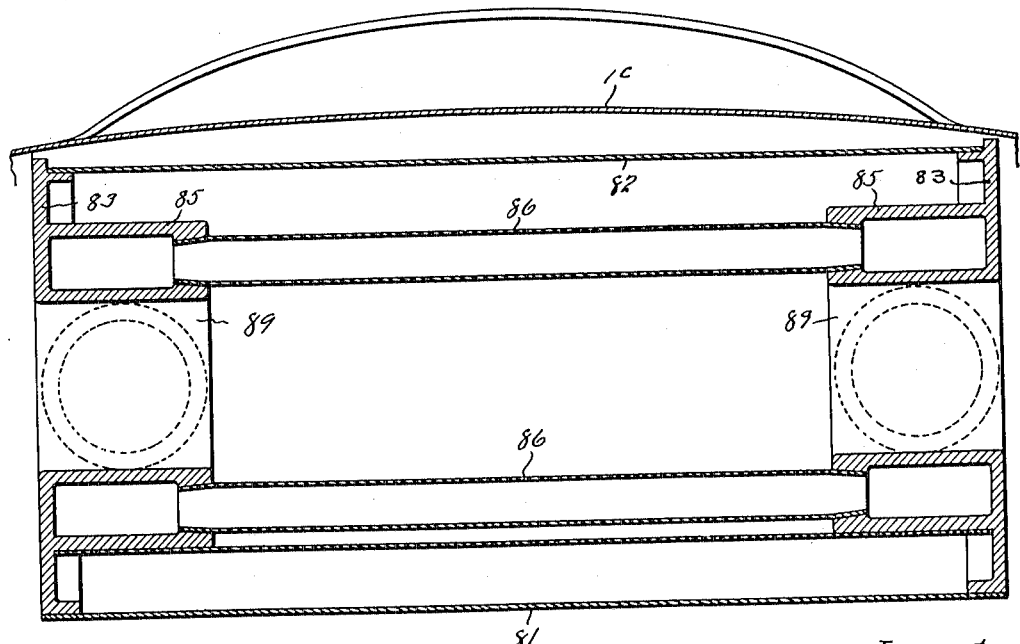

In the drawings, Fig. 1 is a fragmentary perspective view of an automobile incorporating one form of my invention; Fig. 2 is a sectional view on a somewhat larger scale, of the form illustrated in Fig. 1, the section being substantially a central vertical one through the automobile in the region of the cowl; Fig. 3 is a section on the line 3—3 of Fig. 2, looking in the direction of the arrows; Fig. 4 is a view similar to Fig. 3 of a simplified form of the invention; Fig. 5 is a section on the line 5—5 of Fig. 4; Fig. 6 is a sectional view of a further modified form of the invention, and one that is adapted to be attached to the cowl of an automobile as ordinarily constructed, to the top of a closed car, or other convenient part of a conveyance; Fig. 7 is a partial front elevation of the construction illustrated in Fig. 6; Fig. 8 is a central vertical section through an automobile in the vicinity of the dash, showing my improved ventilator, combined with a heater that is supported by the dash; Fig. 9 is a section on the line 9—9 of Fig. 8; Fig. 10 is a diagrammatic representation of a closed motor vehicle equipped with a modified form of the combined ventilator and heater; Fig. 11 is a detail of a three-way valve used in connection with the last modification; and Figs. 12 and 13 are a transverse and a longitudinal section, respectively, through a further modification of the invention wherein the heater is incorporated in the ventilator structure.

I shall now proceed to describe the various forms of the invention in the order in which they appear in the drawings, using like reference characters to designate the corresponding parts throughout the several views.

In Figs. 1, 2 and 3, 1 indicates the cowl of an automobile which terminates at its forward end at the dash 2 and is joined in the vicinity of the dash by the rear end of the hood 3. The usual instrument board 4 depends from the rear edge of the cowl. The cowl 1 is slit transversely a suitable distance rearwardly of the dash 2 and the portion back of the slit is arched upwardly as indicated at 5 to provide an opening 6 that is directed toward the front of the vehicle. The casing of the vertilator comprises a curved wall section 10 which has its upper forward edge embraced by a return-bent flange 11 of the arched portion 5 of the cowl and extends rearwardly and downwardly therefrom and thence forwardly where it joins the lower rear edge of a wall section 12 that extends upwardly along the dash 2 and then rearwardly therefrom immediately beneath the portion of the cowl 1 forwardly of the opening 6. Adjacent this opening the upper edge of a substantially semicylindrical wall 13 joins the rear edge of the wall section 12, the wall 13 approaching rather closely the lower portion of the wall section 10. Flanged end walls 15 are set within the ends of the casing comprising the wall sections 10 and 12, and within apertures of the end walls are supported the inwardly projecting sleeves 16 which constitute the air outlets of the vertilator. The extreme lower portion of the ventilator casing serves as a catch basin from which a drain pipe 17 leads downwardly and may extend to the exterior of the vehicle by being projected through the floor thereof. A baffle 18 is inclined downwardly and rearwardly from the portion of the wall section 12 adjacent the dash 2 and serves as an arrester for any foreign matter which might tend to rise with the current of air. A screen 19 may be disposed across the inlet of the ventilator to prevent the entrance of leaves, large dust particles or other objects held suspended in the air.

For the purpose of controlling the amount of air admitted to the vehicle I may provide dampers 20 disposed within the sleeves 16 and having operating shafts 21 which, in the present instance, are shown as extended rearwardly through the instrument board 4 and provided with knobs 22 whereby they may be turned to open and close the dampers.

With the foregoing construction in mind it will be readily seen that when the vehicle is moving forwardly a current of air will be induced within the ventilator, the air entering through the opening 6 and being directed downwardly and thence forwardly between the walls 10 and 13, the velocity increasing as the walls approach each other. After the air passes the lower edge of the wall 13 it takes an abrupt course upwardly so as to escape through the sleeves 16 and as it swirls upwardly about the edge of the wall 13 and is directed laterally with a spiral action through the sleeves 16 it frees itself of any rain, snow, moisture or dust wherewith it may be ladened, the particles of these heavier substances continuing in their downward and forward course by reason of their inertia to the basin provided by the lower portion of the casing from where they escape through the drain 17, the baffle 18 preventing any of the lighter particles from rising along the front wall of the casing and being caught again by the current of air by which they might be carried to the interior of the vehicle.

Preparatory to installing the form of the invention illustrated in Figs. 4 and 5, an opening 25 is made in the cowl 1ª, and the respective casing members 26 and 27 are applied to the top and bottom sides of the cowl in register with said opening and in such relation to each other as to constitute a substantially spiral casing, the member 27 terminating at its forward edge in an upwardly and rearwardly turned portion 29 which encloses a space serving as a basin from which the drain tubes 30 lead through the end walls 31 of the lower casing member.

In this form of the invention the air is directed by the casing member 26 downwardly through the opening 25 and then by the casing member 27 forwardly, swirling about the rear edge of the portion 29 and escaping into the interior of the vehicle through the elongated opening above said portion. As the air rises over and about the edge of the portion 29, any rain, snow, or particles of other substances heavier than the air, are thrown off into the basin constituted of the lower forward portion of the casing member 27 from which they are discharged through the drain tubes 30.

In Figs. 6 and 7, 35 designates a wall of a vehicle which may be the cowl of the open type automobile, the top of a closed car or any wall of practically any other conveyance. Registering with the openings 36 in the wall 35 are conduits 37, shown as elbows, the lateral branches of the opposed elbows being directed toward each other and passing through end walls 38 of a "snail-shell" casing 39. This casing comprises a substantially semi-cylindrical wall section 40, and a spiral wall section 41, the lower edge of which is spaced radially inward from and somewhat to the rear of the lower forward edge of the wall 40; and just to the rear of the lower edge of the spiral wall 41, the wall 40 is provided with a slot or opening 42. It will be observed from Fig. 6 that the spiral wall 41 is lapped about the inwardly projecting branches of the conduits 37 throughout about one-half their circumference. Attention is directed to the fact that the casing 39 is elevated bodily a short distance above the wall 35 so as to permit of a circulation of air beneath the casing.

It will be understood that this form of ventilator is mounted with the open side of the casing 39 facing toward the front of the vehicle. Therefore, when the vehicle is in motion the major part of the air which passes through the ventilator will be admitted through the main opening, designated 45, and this air will swirl through the casing, escaping through the conduits 37 to the interior of the vehicle, any comparatively heavy particles suspended in the air being thrown off into the lower part of the casing from which they will escape through the slot or opening 42.

The lower portion of the wall 41 will serve to assist in separating heavier particles from the air, and a current of air induced through the auxiliary opening 46 and escaping through the slot or opening 42, will aid in removing the particles from the lower portion of the casing. This action is further enhanced by a current of air passing through the space between the casing and the wall 35 and creating a suction or siphon action through the slot or opening 42.

In Figs. 8 and 9, a heater 50 is shown as set within an opening in the dash 2ᵇ beneath the cowl 1ᵇ. The heater comprises opposed shells 51 and 52 that are shown as connected together by securing means or rivets 52 that pass through abutting flanges of the two shells. The shell 51 is provided with an outlet opening 54 that may be closed by a door 55. Reposing within this casing is a heater of radiator type comprising headers 56 and 57 that communicate through tubes 58. A conduit 60 leads from the exhaust pipe 61 of the internal combustion engine of the vehicle to the header 56 and has a damper 62 by means of which the passage of the exhaust gases to the heater may be controlled. The header 57 is equipped with an outlet conduit 63. The ventilator 65, which is shown essentially like the form illustrated in Figs. 1 to 3, has outlet tubes 66 which lead into the casing 50 through the shell 51. The drain pipe of the ventilator is designated 67.

In this form of the invention, the air passes through the ventilator, is freed of any foreign substance which may escape through the drain 67, and passes on through the outlet conduits 66 into the casing 50. Heated by contact with or radiation from the tubes 58, the air may escape through the opening 54 into the interior of the car, the quantity of the air passing through the heater being controlled by the door 55 which may be opened to any extent desired. When it is taken into account that the quantity of exhaust gases that are directed through the radiator may be controlled by the damper 62 and the quantity of air passing through the casing of the heater may be controlled by the door 55, it will be seen that through this means of heating and ventilating vehicles, practically any desired result may be accomplished within the capacity of the ventilator and heater. For instance, if all cold air is desired, the door 55 may be opened and the damper 62 closed, and the quantity of cold air may be regulated by the adjustment of the door. Also, with the damper 62 wide open so that the heater will operate at its highest efficiency, any quantity of hot air desired may be admitted to the vehicle by the adjustment of the door 55. And again, the temperature of the air, whether its passage through the casing 50 be retarded or not, may be regulated by the adjustment of the damper 62.

In Fig. 10 I have shown (diagrammatically in connection with a closed automobile) my improved ventilator combined with a floor type heater, the ventilator 70 discharging through a conduit 71 into the air circulating space of the heater 72. A three-way valve 74, shown in detail in Fig. 11, is placed within the conduit 71 in the driver's compartment, and the shutter 75 of the valve is adapted to be adjusted within the casing 76 by means of a rack 77 that meshes with a pinion 78 on the shaft of the shutter and which is shown as projecting rearwardly through the instrument board in easy reach of the driver. By this means, the valve may be adjusted to direct a part of the air through the heater and a part directly into the driver's compartment (as illustrated in Fig. 11); to direct all of the air through the heater; to direct all of the air into the driver's compartment, or to shut off the air altogether.

The heater communicates through a conduit 79 with the exhaust line 80 of the engine.

In the embodiment of the invention illustrated in Figs. 12 and 13, a heater is incorporated in the ventilator structure, and while I have shown the heater as one designed to derive its heat from the exhaust pipe of the engine, it will be understood that a heater of any suitable nature may be substituted therefor. This holds true not only with the present modification, but the ones hereinbefore described as it is clearly within the scope and commercial possibilities of my invention to substitute for the exhaust gas heater an electric heater, or one of any other class found suitable for the purpose.

In the present form of my invention the outer wall of the ventilator casing is designated 81, the inner wall 82, and the end walls 83. The latter walls are shown as castings which incorporate headers 85 that communicate through a series of tubes 86. One of the headers 85 has connected to it a conduit 87 which leads from the exhaust pipe of the engine and the other may be connected to a discharge conduit. The pipe 87 is shown as equipped with a damper 88 by means of which the quantity of exhaust gas circulated through the heater may be controlled. The headers 85 are annular in form and surround the outlet openings 89 of the ventilator through which the air is discharged into the vehicle. The casing is provided with a drain 90, and a screen 91 is disposed across the inlet opening thereof. As in the form illustrated in Figs. 1 to 3, the present modification is designed to fit under the forward portion of a cowl 1° and against the dash 2°. It is deemed unnecessary in this embodiment to provide dampers for regulating the quantity of air passing through the ventilator as it is desirable to have as much fresh air inside the vehicle as possible, and by means of the damper 88, the quantity of exhaust gas passed through the heater may be so controlled as to modify the temperature of the air to any extent desired.

Having offered the foregoing as exemplifications of my invention, I claim:

1. For use on automobiles and other vehicles, a ventilator comprising a casing having an inlet opening through which air is directed from the exterior to the interior of the vehicle, the casing having a substantially spiral cross section so as to impart a swirling motion of the air whereby any rain, snow, moisture or other foreign substance wherewith the air may be laden is separated from the air before the air is discharged into the vehicle, a portion of the casing spaced substantially 180° from said inlet opening constituting a basin into which such substance is collected, and means for removing foreign substance from such portion of the casing.

2. A ventilator of the character set forth comprising an elongated casing that is substantially spiral in cross section, the same having an inlet opening along one side and an outlet opening at the end thereof and a discharge opening for foreign substances on the side opposite said inlet opening, the ventilator being adapted to be installed with its inlet opening exterior of a wall of the vehicle and directed toward the front thereof and its outlet opening communicating with the interior of the vehicle.

3. A ventilator of the character set forth comprising an elongated casing that is substantially spiral in cross section and having an inlet opening along one side and an outlet opening at the end thereof, the casing being adapted to be installed with its inlet opening disposed on the exterior of a wall of the vehicle and directed toward the front thereof and with its outlet opening in position to discharge into the interior of the vehicle, and means connected to the side wall of said casing opposite said inlet opening for removing from the casing any foreign substance extracted from the air by centrifugal action as the air is swirled through the casing.

4. The combination with a vehicle wall having an opening, of a ventilator comprising a snail-shell casing disposed partly on the inner side and partly on the outer side of said wall in such relation to the opening as to cause air admitted to the ventilator casing to be directed through said opening with a swirling motion, a portion of the casing constituting a basin in which is collected any foreign substance extracted from the air by centrifugal action due to the aforesaid swirling motion, the casing having an opening through which the air is discharged into the vehicle, and a drain for that portion of the casing which constitutes the basin.

5. The combination of an automobile cowl having an opening in its top, a transversely arranged and downwardly extending air deflecting member connected to the underside of said top at the rear of said opening, end walls on said member spaced from the sides of the cowl and provided with outlets for air deflected by said member.

6. The combination of an automobile cowl having an opening in its top, a transversely arranged and downwardly extending air deflecting member connected to the underside of said top at the rear of said opening, end walls on said member, and a trough at the bottom edge of said deflecting member provided with a discharge outlet.

7. The combination of an automobile cowl having an opening in its top, a transversely arranged and downwardly extending air deflecting member connected to the underside of said top at the rear of said opening, end walls on said member spaced from the sides of the cowl and provided with outlets for air deflected by said member, and dampers for controlling the passage of air through said outlets.

In testimony whereof, I hereunto affix my signature.

DENTON K. SWARTWOUT